Aug. 1, 1950  W. J. MORRILL  2,516,901

ROTOR FOR DYNAMOELECTRIC MACHINES

Filed Feb. 19, 1945

INVENTOR.
Wayne J. Morrill
BY Hoodling and Krost
attys

Patented Aug. 1, 1950

2,516,901

UNITED STATES PATENT OFFICE 2,516,901

ROTOR FOR DYNAMOELECTRIC MACHINES

Wayne J. Morrill, Fort Wayne, Ind.

Application February 19, 1945, Serial No. 578,575

17 Claims. (Cl. 171—252)

My invention relates in general to rotors for dynamo-electric machines and more particularly to rotors having permanent magnet fields.

The operation of a dynamo-electric machine having a rotor constructed of a permanent magnet field is somewhat different from the operation of a conventionally excited machine, in that with the conventional dynamo-electric machine the de-magnetization of the rotor is accompanied by no permanent ill effects. On the other hand, a rotor having a permanent magnet field may be seriously affected by the de-magnetization. The de-magnetization of such a field may permanently reduce the strength of the magnet and reduce the generated voltage. Such reduction is, of course, the equivalent of a reduction in the effective capacity of the machine, the result being that unless some means for preventing the permanent ill effects of de-magnetization is provided, it is necessary to build a considerably larger generator to obtain one having the desired output.

It is possible under certain conditions that most of the magnetomotive force produced by heavy currents in the stator windings may become directly opposed to the permanent magnet flux of the rotor, resulting in a permanent reduction of the magnetic flux of the rotor, the end result being a permanent reduction in the generated voltage of the machine.

An object of my invention is to provide an improved rotor for a dynamo-electric machine, which rotor has permanently built-in features which oppose the de-magnetizing of the permanent magnet field of the rotor.

Another object of my invention is to use a permanent magnet field to its maximum magnetic advantage.

Another object of my invention is to construct the permanent magnet field out of a plurality of permanent magnetic blocks, skewed or unskewed.

Another object of my invention is to construct a rotor of the permanent magnet type whereby the permanent magnet parts may be readily fastened to the rotating body mounted on the shaft of the rotor.

Another object of my invention is the provision of mounting a plurality of permanent magnet blocks annularly around a rotating body of magnetic material, the sides of adjacently disposed blocks forming transversely disposed slots to receive short circuited winding means for preventing de-magnetization of the magnets.

Another object of my invention is the provision of fastening the permanent magnet blocks and the winding means to a rotating body of magnetic material by common fastening means.

Another object of my invention is the provision of a rotor which will stand a great deal of magnetic abuse without materially de-magnetizing the permanent magnet field.

Another object of my invention is the provision of a permanent magnet type of rotor wherein the permanent magnets are maintained at substantially uniform field strength throughout the major portion of the pole faces of the magnets.

Another object of my invention is the provision of a permanent magnet type of rotor which is simple of manufacture and which will stand a great deal of mechanical abuse and which will maintain its magnetic properties throughout a long period of operation.

Other objects and a fuller understanding of my invention may be had by referring to the following description and claims, taken in combination with the accompanying drawing, in which:

Figure 1:
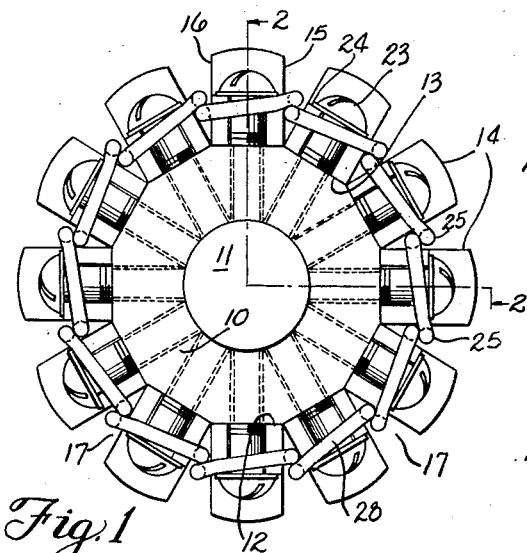
Figure 1 is an end view of a rotor embodying the features of my invention.
Figure 2:
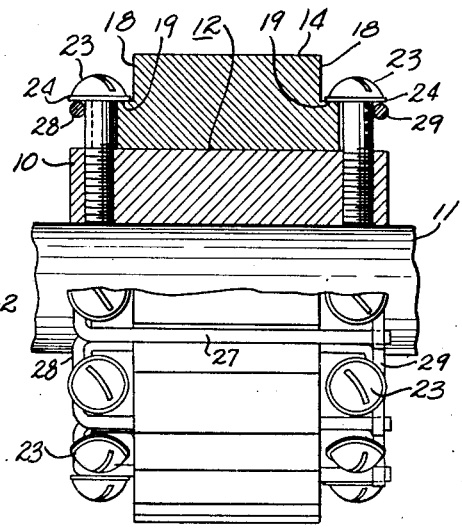
Figure 2 is an elevational side view of the rotor with substantially the upper half shown in cross-section, the cross-section being taken along the vertical line 2—2 of Figure 1.
Figure 3:
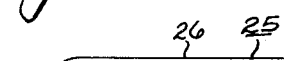
Figure 3 shows a plan view of one of the closed short circuited windings which surround each of the permanent magnet blocks.

With reference to Figures 1 and 2 of the drawing, my invention comprises generally a centrally disposed rotating body 10 around which are mounted a plurality of blocks of permanent magnet material 14, each being surrounded by a short circuited winding 25.

The rotating body is provided with a shaft 11 and is arranged to be rotatively operated within a stator of a dynamo-electric machine. The rotating body 11 is preferably constructed of soft steel or of any other suitable magnetic material. The outer annular surface of the rotating body is designated by the reference character 12 and comprises a plurality of flat angularly related surfaces 13 against which the bottom sides of the permanent magnet blocks are mounted. The permanent magnet blocks are substantially identical and the sides thereof are indicated by the reference characters 15 and 16 and when the blocks are mounted upon the rotating body the adjacent sides of the blocks form V-shaped transversely disposed slots 17 to receive the short circuited windings 25. The sides 15 and 16 of the permanent magnet blocks contact or meet each other at the outer annular surface 13 of the rotating body 12 whereby the plurality of permanent magnet blocks are constrained against movement in a circumferential direction. The ends of the permanent magnet blocks are designated by the reference character 18 and each end is provided with a laterally disposed shoulder 19. The top edges of the permanent magnet blocks are alternately north and south poles, respectively, and are disposed substantially 180 electrical degrees apart. My invention may comprise any number of permanent magnet blocks, depending upon the design requirements.

The windings 25 are substantially identical and comprise two side portions 26 and 27 and two ends 28 and 29. The end 29 is connected to the side 27 at a connection 30 preferably made by welding or by any other suitable means to give a short circuited winding. The windings respectively surround the permanent magnet blocks with the sides 26 and 27 disposed in the V-shaped slots 17. The ends 28 and 29 of the windings extend around the ends of the permanent magnet blocks.

As illustrated, the plurality of permanent magnet blocks and the windings 25 are secured to the rotating body 10 by means of screws 23 having washers 24 provided under the heads thereof. The washers engage the laterally disposed shoulders 19 and the end portions 28 and 29 of the short circuited winding 25. In other words, the screw heads and the washers overlap both the laterally disposed shoulders 19 of the permanent magnet blocks and the end portions of the short circuited winding 25 for pressing both the laterally disposed shoulders and the end portions of the windings toward the rotating body. The side 26 of a short circuited winding and the side 27 of a next adjacent winding are disposed in the same V-shaped slot with the side 26 pressing against the sides of the V-shaped slot underneath the side 27. The short circuited windings 25 are constructed of relatively heavy pieces of wire or bars and the pressing of the end portions 28 and 29 towards the body by the screw heads and the washers likewise presses the sides 26 and 27 firmly in the V-shaped slots.

Figure 4:
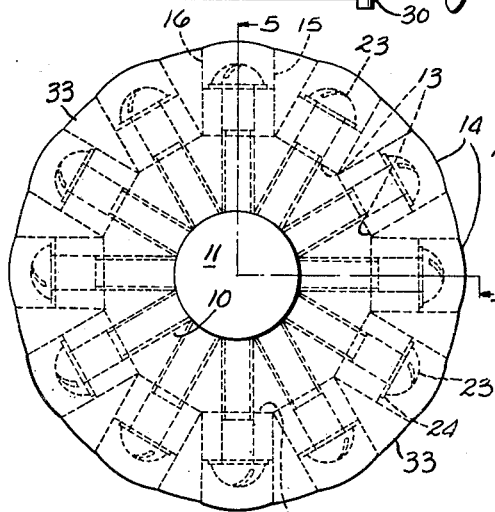
Figure 4 is a view similar to Figure 1, but shows a modified form of my invention, in which the end rings and the current conducting members are cast about the permanent magnet block and the rotating body.
Figure 5:
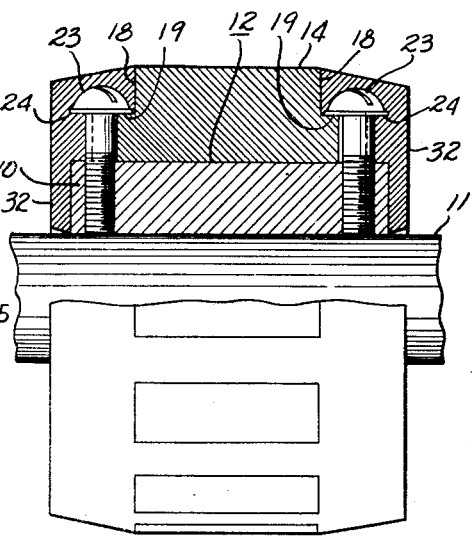
Figure 5 is an elevational side view of the rotor shown in Figure 4 with substantially the upper half shown in cross-section, the cross-section being taken along the vertical line 5—5 of Figure 4.

In Figures 4 and 5 I show a modified form of the invention, in that in this invention I provide cast end rings 32 upon each end of the rotor and cast current conducting members 33 in the V-shaped slots. The cast end ring 32 and the cast current conducting members 33 may be integrally cast about the rotating body and the plurality of permanent magnet blocks. The cast end rings which engage the laterally disposed shoulders 19 provide, in addition to the screws and the washers, for holding the permanent magnet blocks to the rotating body. In this form of the invention, the screws and washers may be dispensed with since the cast material holds the permanent magnet block against the rotating body. The entire construction is such that it may be readily assembled upon the rotating body. By using permanent magnet blocks as illustrated, I am able to simplify the construction of my rotor in that the blocks may be of uniform size and avoid all of the difficulty incident to the forming of the permanent magnet field in some other shape. Since the permanent magnet field is constructed of a plurality of blocks I am able to use the permanent magnet field to its maximum magnetic advantage.

The purpose of the heavy short circuited windings in both types of construction is to prevent de-magnetization of the permanent magnet blocks under transient or short circuit conditions of the stator and it has been determined that the conductivity of this heavy short circuited turn should preferably be approximately equal to or slightly greater than the conductivity of the stator winding when measured with reference to the rotor winding. The flux passes directly through the blocks in a straight line path and there is no interference with the passage of this straight line flux. The action of the heavy short circuited turn to prevent de-magnetization of the permanent magnet blocks may best be understood by the following discussion:

If the stator is suddenly short circuited at the time that the rotor flux through it is maximum, the ensuing effects can be understood by use of the well-known principle applying to transients, termed the principle of "constant linkages." According to the principle of constant linkages, the flux linkage in any electro-magnetic structure must remain constant for the first instant following a short circuit because of the induced heavy currents which oppose a change in flux. With this in mind, it will be seen that immediately after a short circuit of the stator at a time approximating maximum rotor flux linkages, the short circuited stator winding will momentarily lock the linked flux in place while the rotor continues to turn first to a position at right angles to the locked flux and then to a position in which the permanent magnet is directly opposed to the locked flux. Under this opposed condition, the tendency would be for the permanent magnet to be directly de-magnetized by the heavy reversed magnetomotive force of the stator and the characteristics of the dynamo-electric machine embodying the rotor would be permanently damaged. When a heavy short circuiting turn of conductivity equal to the referred conductivity of the stator winding is introduced around the permanent magnet of the rotor, the currents which are induced in this heavy short circuited turn tend to maintain the rotor flux at a constant value, and as a result, the magnetomotive force of the heavy rotor short circuiting turn opposes and neutralizes the magnetomotive force of the short circuited stator winding, preventing the permanent magnet rotor core from being de-magnetized. In the event that a short circuit should occur in the stator winding when the rotor flux linkages are substantially zero, a transient of a different type will take place because at that time there exists in the stator winding substantially maximum voltage. At this instant of short circuit, the current in the stator winding will rapidly rise and produce a strong stator magnetomotive force which will again have a de-magnetizing effect on the rotor. Under certain conditions this last mentioned transient de-magnetizing effect might be expected to be less than that occurring when the rotor flux linkages are maximum.

The best available permanent magnet materials operate efficiently in dynamo-electric machines when the flux density in the permanent magnet itself is uniform throughout the magnet. The presence of the magnetic material constituting the rotating body tends to establish an equipotential magnetic surface at the poles of the permanent blocks and thus tends to produce a uniform magnetic density in the permanent magnet material.

The construction of the permanent magnet blocks as shown provides the possibility of chamfering the pole tips or outer pole face surfaces by grinding or otherwise shaping the blocks separately on a smaller radius than the rotor. This is desirable because it reduces the abruptness of the change of the flux in the stator teeth, thus reducing the pole face and tooth pulsation losses in the tooth faces in the bodies of the teeth themselves.

In machines having many poles, I have found that in order to secure a good voltage wave form it is necessary to spiral or skew either the rotor or the stator by an amount equal to slightly more than one slot pitch of the stator. For example, in the case of an alternator having three slots per pole in the stator, it is possible to eliminate the third harmonic in the voltage wave by using a two-thirds coil pitch. However, the fifth, seventh and many higher harmonics still exist and it will usually be necessary to skew either the stator or rotor member by an amount corresponding to approximately two pole pitches of the fifth harmonic, or two-fifths of a pole pitch for the fundamental. Such a spiral not only completely eliminates the fifth harmonic but greatly reduces all of the higher harmonics.

In rotors of the type shown for this invention, it is not feasible to produce the necessary spiral by inclining the flat surfaces 13 on which each pole or block rests on the hub or rotating body 10, because such a form of hub or body would be extremely difficult to make since it would involve milling helical surfaces on the hub and grinding mating helical surfaces on the pole pieces or blocks. No equipment for grinding the pole pieces in that form in an economical fashion is available, it being much more practical to grind the blocks such that the sides are parallel or such that the pole pieces can be produced by a cylindrical grinding operation.

Figure 6:
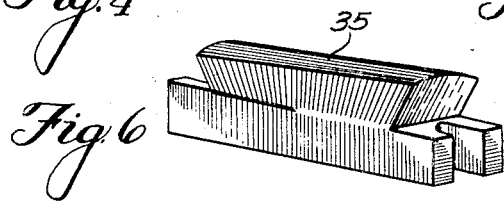
Figure 6 is a modified or skewed permanent magnet block.

A spiral or skewed effect can be obtained by modifying or twisting the form of the permanent magnet blocks. Such a block is indicated by the reference character 35 in Figure 6. The bottom base portion of the block is the same as the bottom base portion of the straight-sided blocks previously described, but the top pole surface portion is twisted or skewed. The top pole surface portion is twisted or deflected with respect to the base portion in a counter-clockwise direction such that the left-hand end of the top pole surface portion in Figure 6 is twisted towards the observer and the right-hand end away from the observer. A pole piece or block as shown in Figure 6 produces the effect of a skew and still retains a simple rotating hub or body and simple grinding. The amount of the skew is governed by conditions described above.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

1. A rotor for a dynamo-electric machine, said rotor comprising, in combination, a rotating body of magnetizable material, said body having an outer annular surface, a plurality of independent blocks of permanent magnet material mounted around the outer annular surface, said blocks having sides extending outwardly from the outer annular surface and forming transversely disposed slots therebetween, an independent short circuited winding surrounding each of said blocks and disposed in said slots, and a plurality of independent mountings for securing the independent windings around their respective blocks and in the slots between adjacent blocks and in contact with the sides thereof.

2. A rotor for a dynamo-electric machine, said rotor comprising, in combination, a rotating body of magnetizable material, said body having an outer annular surface, a plurality of independent blocks of permanent magnet material mounted around the outer annular surface, said blocks having sides extending outwardly from the outer annular surface and forming transversely disposed slots therebetween, an independent short circuited winding surrounding each of said blocks, said winding each comprising a closed loop having side portions disposed in said slots and end portions extending around the ends of the blocks, and a plurality of independent mountings for securing the independent windings around their respective blocks and in the slots between adjacent blocks and in contact with the sides thereof.

3. A rotor for a dynamo-electric machine, said rotor comprising, in combination, a rotating body of magnetizable material, said body having an outer annular surface, a plurality of blocks of permanent magnet material disposed around the outer annular surface, said blocks having sides extending outwardly from the outer annular surface and forming transversely disposed slots therebetween, short circuited winding means surrounding each of said blocks and disposed in said slots, and means for securing said blocks to said body, said means also engaging said winding means for securing same around said blocks.

4. A rotor for a dynamo-electric machine, said rotor comprising, in combination, a rotating body of magnetizable material, said body having an outer annular surface, a plurality of blocks of permanent magnet material mounted around the outer annular surface, said blocks having sides extending outwardly from the outer annular surface and forming transversely disposed slots therebetween and having ends with each comprising a laterally disposed shoulder, short circuited winding means surrounding each of said blocks, said winding means each comprising a closed loop having side portions disposed in said slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body.

5. A rotor for a dynamo-electric machine, said rotor comprising, in combination, a rotating body of magnetizable material, said body having an outer annular surface, a plurality of blocks of permanent magnet material mounted around the outer annular surface, said blocks having sides extending outwardly from the outer annular surface and forming transversely disposed V-shaped slots therebetween and having ends with each comprising a laterally disposed shoulder, short circuited winding means surrounding each of said blocks, said winding means each comprising a closed loop having side portions disposed in said V-shaped slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body, the sides of said V-shaped slots holding said winding means at a spaced outward distance from the outer annular surface of the rotating body.

6. A rotor for a dynamo-electric machine, said rotor comprising, in combination, a rotating body of magnetizable material, said body having an outer annular surface, a plurality of blocks of permanent magnet material mounted around the outer annular surface, said blocks having sides extending outwardly from the outer annular surface and forming transversely disposed V-shaped slots therebetween and having ends with each comprising a laterally disposed shoulder, short circuited winding means surrounding each of said blocks, said winding means each comprising a closed loop having side portions disposed in said V-shaped slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body, said securing means in pressing the end portions of the winding means toward the rotating body also pressing the side portions of the winding means into said V-shaped slots to anchor same therebetween against circumferential movement.

7. A rotor for a dynamo-electric machine, said rotor comprising, in combination, a rotating body of magnetizable material, said body having an outer annular surface, a plurality of blocks of permanent magnet material mounted around the outer annular surface, said blocks having sides extending outwardly from the outer annular surface and forming transversely disposed V-shaped slots therebetween and having ends with each comprising a laterally disposed shoulder, short circuited winding means surrounding each of said blocks, said winding means each comprising a closed loop having first and second side portions disposed in said V-shaped slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body, a first side portion of one winding means and a second side portion of the next adjacent winding means being disposed in the same V-shaped slot with the first side portion pressing against the sides of the V-shaped slots underneath the second side portion.

8. A rotor for a dynamo-electric machine, said rotor comprising, in combination, a rotating body of magnetizable material, said body having an outer annular surface comprising a plurality of angularly related flat surfaces, a plurality of blocks of permanent magnet material each having flat bottom surfaces respectively mounted against the angularly related flat surfaces of the rotating body, said blocks having sides extending outwardly from the outer annular surface and forming transversely disposed V-shaped slots therebetween and having ends with each comprising a laterally disposed shoulder, the sides forming the V-shaped slots contacting each other at the outer annular surface of the rotating body, short circuited winding means surrounding each of said blocks, said winding means each comprising a closed loop having side portions disposed in said V-shaped slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body.

9. A rotor for a dynamo-electric machine, said rotor comprising, in combination, a rotating body of magnetizable material, said body having an outer annular surface, a plurality of blocks of permanent magnet material, said blocks comprising, elongated base portions non-skewably mounted around the outer annular surface, pole face surface portions integrally joined with the base portions and extending outwardly from the base portions and skewed relative thereto, said blocks having sides extending outwardly from the outer annular surface and forming transversely disposed slots therebetween and having ends with each comprising a laterally disposed shoulder, end rings for said rotor, and current conducting members substantially completely filling said slots having ends connected to said end rings, said end rings engaging the laterally disposed shoulders of said blocks and securing same to the rotating body.

10. A rotor for a dynamo-electric machine, said rotor comprising, in combination, a rotating body of magnetizable material, said body having an outer annular surface, a plurality of blocks of permanent magnet material, said blocks comprising, elongated base portions non-skewably mounted around the outer annular surface, pole face surface portions integrally joined with the base portions and extending outwardly from the base portions and skewed relative thereto, said blocks having sides extending outwardly from the outer annular surface and forming transversely disposed slots therebetween and having ends with each comprising a laterally disposed shoulder, end rings for said rotor, and current conducting members substantially completely filling said slots having ends connected to said end rings, said end rings engaging the laterally disposed shoulders of said blocks and securing same to the rotating body, said end rings and said current conducting members being integrally cast with each other and about the rotating body and the blocks of permanent magnet material, said cast end rings engaging the laterally disposed shoulders of said blocks and securing same to the rotating body.

11. A rotor for a dynamo-electric machine, said rotor comprising, in combination, a rotating body of magnetizable material, said body having an outer annular surface, a plurality of blocks of permanent magnet material, said blocks comprising, elongated base portions non-skewably mounted around the outer annular surface, pole face surface portions integrally joined with the base portions and extending outwardly from the base portions and skewed relative thereto, said blocks having sides extending outwardly from the outer annular surface and forming transversely disposed slots therebetween, a short circuited winding surrounding each of said blocks and disposed in said slots, and means for securing said winding around said blocks and in said slots in contact with the sides thereof, said blocks of permanent magnet material each having an outer pole face surface with a single radius smaller than that of the rotor for reducing the abruptness of change of flux in the rotor.

12. A rotor for a dynamo-electric machine, said rotor comprising, in combination, a rotating body of magnetizable material, said body having an outer annular surface, a plurality of independent blocks of permanent magnet material mounted around the outer annular surface, each said block comprising a base portion non-skewably engaging the outer annular surface of said rotating body and a pole face surface portion integrally joined longitudinally of the base portion and skewed with respect to said base portion, said blocks having sides extending outwardly from the outer annular surface and forming transversely disposed slots therebetween, a short circuited winding surrounding each of said blocks and disposed in said slots, and means for securing said winding around said blocks and in said slots in contact with the sides thereof.

13. A rotor for a dynamo-electric machine, said rotor comprising, in combination, a rotating body of magnetizable material, said body having an outer annular surface, a plurality of independent blocks of permanent magnet material mounted around the outer annular surface, each said block comprising a base portion non-skewably engaging the outer annular surface of said rotating body and a pole face surface portion integrally joined longitudinally of the base portion and skewed with respect to said base portion, said blocks having sides extending outwardly from the outer annular surface and forming transversely disposed V-shaped slots therebetween and having ends with each comprising a laterally disposed shoulder short circuited winding means surrounding each of said blocks, said winding means each comprising a closed loop having first and second side portions disposed in said V-shaped slots and end portions extending around the ends of the blocks, and securing means for securing said blocks and said winding means to said body, said securing means each having a laterally extending portion for overlapping a laterally disposed shoulder of a block and an end portion of a winding means extending therearound for pressing both said laterally disposed shoulder and said end portion toward said rotating body, a first side portion of one winding means and a second side portion of the next adjacent winding means being disposed in the same V-shaped slot with the first side portion pressing against the sides of the V-shaped slots underneath the second side portion.

14. A rotor for a dynamo-electric machine, said rotor comprising, in combination, a rotating body of magnetizable material, said body having an outer annular surface, a plurality of independent blocks of permanent magnet material mounted around the outer annular surface, each said block comprising a base portion non-skewably engaging the outer annular surface of said rotating body and a pole face surface portion integrally joined longitudinally of the base portion and skewed with respect to said base portion, said blocks having sides extending outwardly from the outer annular surface and forming transversely disposed slots therebetween and having ends with each comprising a laterally disposed shoulder, end rings for said rotor, and current conducting members substantially completely filling said slots having ends connected to said end rings, said end rings engaging the laterally disposed shoulders of said blocks and securing same to the rotating body.

15. A permanent magnet adapted to be mounted on a rotatable rotor body, said magnet comprising, an elongated base portion non-skewably mountable on the rotor body and provided with end shoulder surfaces disposed substantially in a common plane, an elongated pole face surface portion integrally joined with the base portion between the end shoulder surfaces, said elongated pole face surface portion extending outwardly from the base portion and skewed relative thereto, and means engaging the said end shoulder surfaces for non-skewably securing said base to said rotatable body.

16. A rotor for a dynamo-electric machine, said rotor comprising, in combination, a rotatable body of magnetizable material, said rotatable body having an outer annular surface, a plurality of permanent magnet blocks non-skewably mounted around the outer annular surface, each of said blocks including, an elongated base portion and an integrally joined elongated pole face portion, said base portion providing end shoulder surfaces disposed in a common plane, said elongated pole face portion integrally joining the base portion between the end shoulder surfaces and skewed relative thereto, said elongated base portions and the respective integrally joined elongated pole face portions extending outwardly from the annular surface and thereby forming transversely disposed slots between the permanent magnet blocks, and short circuited means surrounding each of said blocks and disposed in said slots.

17. A permanent magnet block removably mountable on a rotor, said block comprising an elongated base portion, and an elongated pole face surface portion skewed relative to the base portion and integrally joining the base portion throughout a major portion of the length thereof.

WAYNE J. MORRILL.

REFERENCES CITED

The following references are of record in the file of this patent:

UNITED STATES PATENTS

| Number | Name | Date |
|---|---|---|
| 687,991 | Churchward | Dec. 3, 1901 |
| 1,638,614 | Brewster | Aug. 9, 1927 |
| 1,890,752 | Sanford | Dec. 13, 1932 |
| 2,193,675 | Merrill | Mar. 12, 1940 |
| 2,270,141 | Potter | Jan. 13, 1942 |
| 2,303,893 | Mullner | Dec. 1, 1942 |
| 2,312,101 | Killam et al. | Feb. 23, 1943 |
| 2,369,599 | Morrison | Feb. 13, 1945 |

FOREIGN PATENTS

| Number | Country | Date |
|---|---|---|
| 309,294 | Great Britain | Apr. 11, 1929 |